United States Patent [19]

Vogel et al.

[11] Patent Number: 4,707,368

[45] Date of Patent: Nov. 17, 1987

[54] PROCESS OF STEAMING AND PERCOLATING COFFEE

[75] Inventors: Gerald J. Vogel, Tarrytown, N.Y.; Donald T. Kearney, Bayonne, N.J.; Belkis K. Akpinar, Parsippany, N.J.; Charles T. Moorman, Harrington Park, N.J.

[73] Assignee: General Foods Corporation, White Plains, N.Y.

[21] Appl. No.: 802,792

[22] Filed: Nov. 27, 1985

Related U.S. Application Data

[63] Continuation-in-part of Ser. No. 701,822, Feb. 14, 1985, abandoned, which is a continuation-in-part of Ser. No. 588,830, Mar. 12, 1984, abandoned.

[51] Int. Cl.$^4$ .......................... A23F 5/26; A23F 5/48
[52] U.S. Cl. .................................... 426/386; 426/432; 426/434
[58] Field of Search ................ 426/594, 386, 432, 434

[56] References Cited

U.S. PATENT DOCUMENTS

| 3,132,947 | 5/1964 | Mahlmann | 426/386 |
| 3,615,666 | 10/1971 | Achlichter et al. | 426/386 |
| 3,620,758 | 11/1971 | Friedman et al. | 426/386 |
| 3,717,472 | 2/1973 | Strobel | 426/594 |
| 4,092,436 | 5/1978 | MacDonald | 426/386 |
| 4,100,305 | 7/1978 | Gregg | 426/386 X |

FOREIGN PATENT DOCUMENTS 1466881  3/1977  United Kingdom ............... 426/386

Primary Examiner—Joseph Golian
Attorney, Agent, or Firm—Thomas A. Marcoux; Michael J. Quillinan; Daniel J. Donovan

[57] ABSTRACT

This invention relates to an improved process for steaming and later extracting roasted and ground coffee and the product of such process. The process comprises vacuum steaming roasted and ground coffee in a percolator at a temperature less than 200° F. at a pressure of from 10" to 27"(Hg) and recovering the steam aroma produced by passing same through a wedge-wire draw-off apparatus, the draw-off apparatus comprising a helically wound wire assemblage being internal to the percolator. Thereafter the coffee is percolated to extract solids therefrom and the extract and aroma are combined and dehydrated to form a soluble coffee product.

14 Claims, 6 Drawing Figures

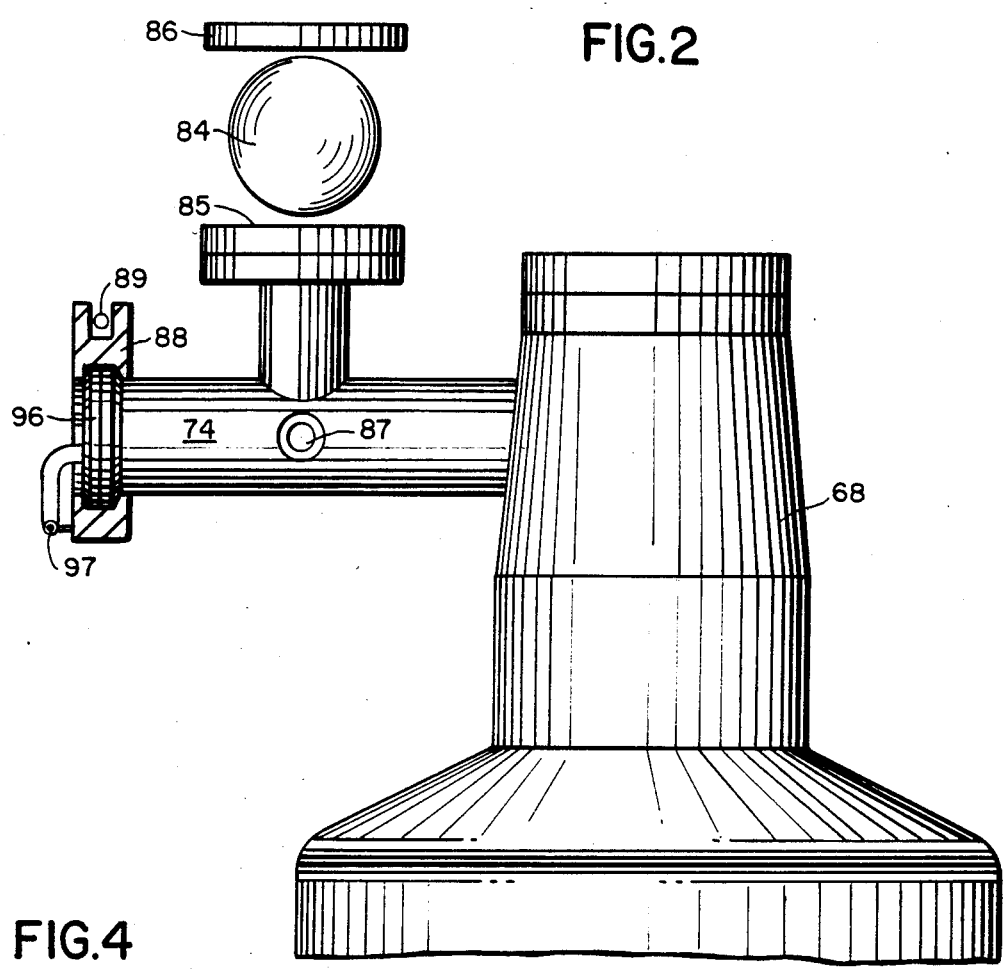
FIG.2
FIG.4
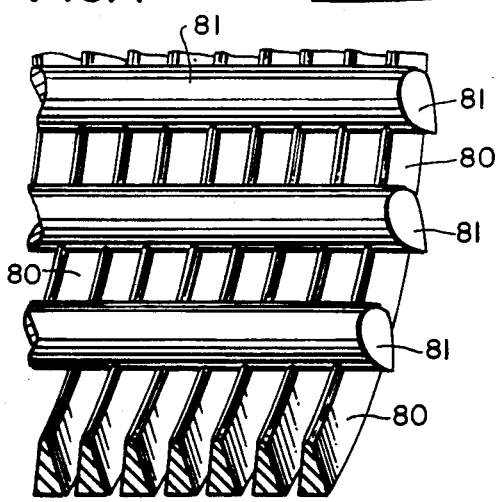
FIG.5
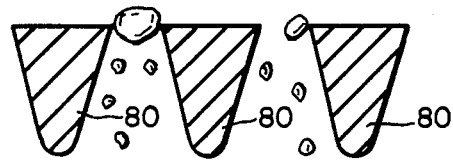

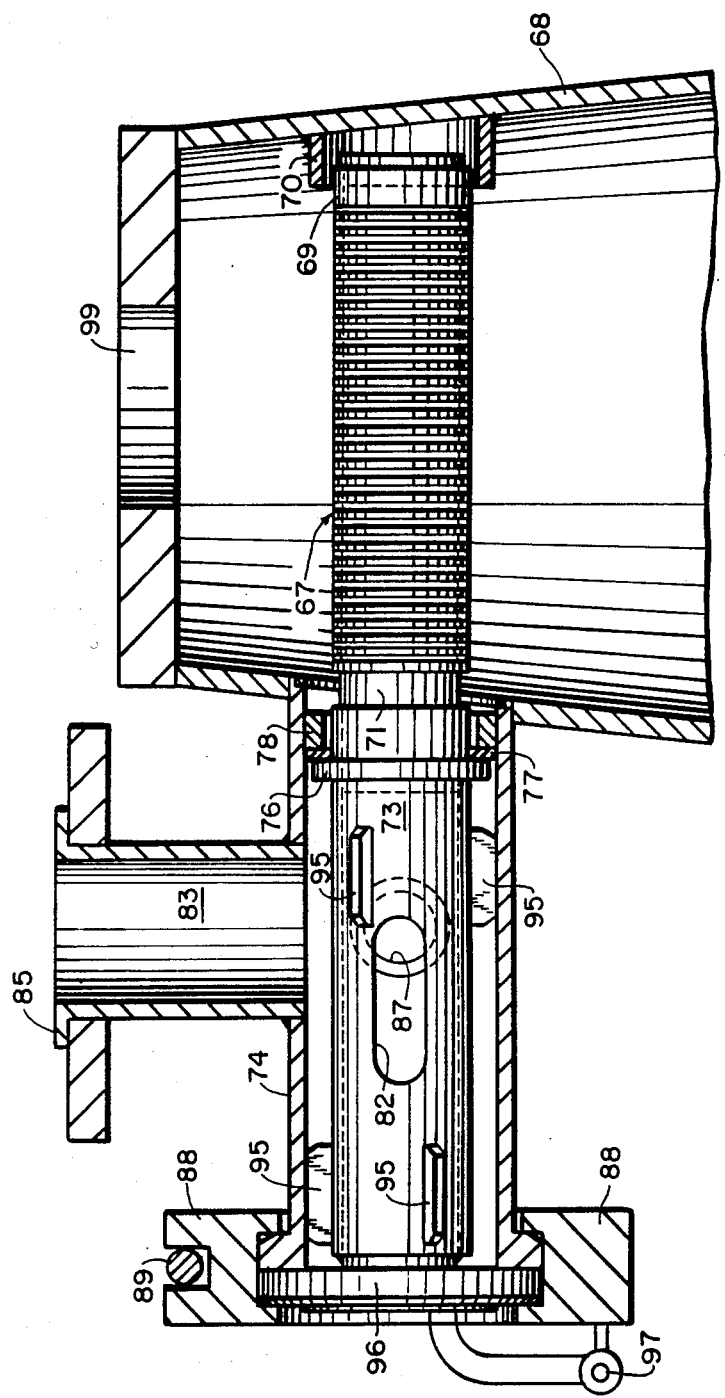

PROCESS OF STEAMING AND PERCOLATING COFFEE

This application is a continuation-in-part of our now abandoned application, Ser. No. 701,822 filed Feb. 14, 1985, which in turn is a continuation-in-part of our application, Ser. No. 588,830 filed Mar. 12, 1984 which is now abandoned.

TECHNICAL FIELD

This invention relates to a novel and improved method for steaming and later extracting roasted and ground coffee and the product of such method.

BACKGROUND OF THE INVENTION

Heretofore the concept of using a steam aroma generated by wetting a bed of freshly roasted and ground coffee with steam admitted to an extremity of a percolator column has been taught. Thus, procedures have been suggested which call for employing the arts of steam aroma collection to a bed of coffee, whence the aromas are added to coffee extract of typically 40% solids and above, whereafter the blend of aroma and extract would be spray-dried, freeze-dried or otherwise dessicated to a stable moisture. Such art practices have not risen to the level whereat they have been feasible commercially, so far as is presently known.

To explain, prior art procedures employing temperatures in the neighborhood of 200° F. and more have been suggested, steaming temperature being 212° to 270° F. However, when such conditions are practiced in large scale equipment such as multi-train percolators, it has been generally found necessary to employ high steaming pressures in the percolator prior to aqueous extraction to get an acceptable rate of steam aroma recovery. The accompanying high temperatures may unduly degrade the body of roasted and ground coffee for later extraction and in any event provide an inferior quality steam aroma. Attempts previously at practicing a lower steaming temperature than 200° F. through use of vacuum have been totally unsuccessful.

To explain further, the details of such a steam aromatization process is set forth in U.S. Pat. No. 3,132,947 to James P. Mahlmann for Method Of Producing Aromatized Coffee Extract. The Mahlmann process produces a product which on a modest scale will provide the desirable volatile coffee flavor intended, viz. one wherein a distilled volatile organic substances is volatilized by the use of steam. This practice employs a modicum of fluxing and rectification as the steam enters a percolator column and migrates upwardly. The problem with such procedures is that in scaling them to reasonable plant size, they fall short of the mark. The principal art problem has involved the means whereby the water soluble solids of an aqueous extract thereafter produced is effectively combined with desired volatile constituents.

To be sure, treatment in a sufficiently elongated vessel can achieve at times development and rectification of the flavor volatiles and a separation and depletion of co-distilled organic acids. However, when one attempts to practice such a process on a reliable commercial scale in extraction columns having a diameter exceeding substantially 16 inches, significant problems are encountered. Treatment is still required calling for condensation and revaporization of flavor volatiles as set forth in the Mahlmann patent. But means must be provided whereby the aromatic flavor values are recovered without at the same time denigrating the flavor quality of extract subsequently recovered from the roasted and ground coffee itself. When scaling up from the conditions set forth in Mahlmann, condensation and refluxing becomes a problem. Provision of sufficient steam aroma to effect the intended results while at the same time avoiding excessive wetting of the coffee particles, has eluded skilled art workers for decades.

DISCLOSURE OF THE INVENTION

The practice of the present invention involves the use of a vacuum process to facilitate aroma collection. Means has been realized whereby the practice of vacuum steaming a columnar bed of roasted and ground coffee before percolation occurs, steaming being at a temperature below 200° F. To achieve this it has been determined that the upper extremity of each coffee column top should be provided with a specially designed draw-off apparatus. Essentially, this is achieved by replacing the perforated pipe at the top of the column which has been traditionally employed in prior art practices with equipment of a special design, generally speaking a wedge-wire bayonet, wherethrough aroma extraction and percolation can also be subsequently performed. The bayonet, being internal to the percolator, can be readily cleaned during blow down, the time period immediately after percolation.

By virtue of the present practice, a consistent steaming operation under a vacuum can be afforded, allowing both treatment to yield a steam aroma of the type set forth in Mahlmann and subsequent extract draw-off, and which can be cleaned during blow down. The bayonet has the ability to afford minimal slot openings so as to maintain low pressure drop across the bayonet while restraining bed shifting during steaming and later extraction.

Advantageously, it has been found that in practicing the procedures of the present invention the maximum temperatures experienced during the steaming operation may be reduced to well below 200° F. and commonly will be less than 160° F. and preferably 140° to 130° F. At temperatures above 200° F., there is an increase in the generation of burnt coffee flavor notes in the aroma which is undesired. There may also be experienced a temperature-runaway at above 200° F. Also, at such elevated temperatures, there can be a noticeable precipitation of undesired phenolic and like compounds which are soluble at high temperatures and can impact the steaming operation by plugging condenser tubes. At temperatures below 200° F. it will be practical to employ a vacuum of from 10 to 27 inches of mercury, commonly in the neighborhood of 23 to 26 inches, although even lower vacuums closer to atmospheric pressure may be produced to like advantage but with a longer steaming time.

At these extremely high vacuums and the collateral reduced temperatures, the bed of roasted and ground coffee may be percolated subsequently over periods lasting as long as three to six hours for a typical extract having 40% to 55% and higher solids content after percolation and later concentration prior to drying. It should be recognized that a shorter time period but in excess of one hour may be employed to like advantage, in which case a lower yield of solids is obtained generally exceeding 20%.

It should be recognized at this juncture that this bayonet feature per se is not new, such equipment being used in waste water treatment and the like such as carbon adsorption. However, adaptation of that bayonet to the features of the present invention is novel. Indeed this is the first known commercial use of such a bayonet for coffee.

It is a desirable to shorten the steaming time to less than one half (½) hour for batch operation, since otherwise the extraction cycle(s) in the following percolation operation may be impacted adversely. Longer steaming times may be used when additional percolator columns are added to the given set thereof, permitting a more gradual steaming. For present purposes six columns are employed but the number indicated could range from four to as high as ten. For continuous steaming under like conditions the treatment period will be less. Steaming should in any event exceed 10 minutes during which interval refluxing and rectifiction will transpire over the length of the percolator, much as described in the aforesaid Mahlmann patent.

Draw off of aroma does not occur for the first 5 minutes. Generally, steaming with saturated steam should occur over a period of at least 15 minutes. It should be noted that preferably prior to steaming the coffee bed is wetted with water at ambient temperature or above until an average moisture content in the range of 15-30% is uniformly realized; this is done on charging the coffee to the percolator. However, it is found that less preferred results are obtained when coffee has been prewet to a lower moisture than 15%. Indeed, it is contemplated, though less preferred, that steam aroma may be recovered from coffee that has not been prewet. It has been generally found that a greater quantity of steam aroma and a preferred quality is obtained when the coffee has been prewet.

It will be understood that the foregoing criteria apply to a fixed vertical bed of at least 18 inch diameter and of 8 feet or more of length. Preferably the bed of roasted and ground coffee should have a length to diameter ratio of 4:1 to 7:1, most commonly 6:1, and a height of 10 to 20 feet commonly 15.3 feet and a diameter of 25-35 inches, commonly 30 inches.

In carrying out the present process, much as is set forth in the aforesaid Mahlmann patent, the steam treatment of the coffee effects an internal refluxing and rectification of a co-distilled mixture of steam, acids and volatile flavors. The present invention contemplates as its preferred embodiment treatment with steam after the coffee has been previously wetted to the aforementioned 15 to 30% moisture. Thus, as steam is admitted, it further wets the coffee—a steam-aromatized portion of the coffee again condensing on the coffee particles. Eventually the particles warm to a temperature above the wetted temperature to a temperature approaching that of the steam. This process continues upwardly throughout the length of the column, it being understood that the coffee is originally loaded to the point of coverage of the horizontal bayonet. The steam is admitted to the column at a rate and pressure sufficiently slow to distill volatile constituents from the coffee particles, the steam being introduced at the bottom of the columns undergoing treatment usually through a perforated pipe at a supply pressure of up to 50 psig, preferably 20 to 40 psig, the pressure being measured prior to introduction into the pipe. After being introduced through the pipe, the pressure of the steam drops due to the vacuum condition present within the column. While the steam which is supplied to the column through the perforated pipe may be at temperatures which approach as high as 285° F. with corresponding pressures as high as 50 psig, upon crossing the pipe and entering the column, the temperature will in all cases be below 200° F. under the vacuum conditions present therein. The process continues until sufficient aroma has been condensed and collected at approximately room temperature. The steaming is essentially that set forth in Mahlmann aforesaid, commencing at column 2, line 68 and continuing to column 3, line 41. During vacuum steaming the roast and ground coffee particles are maintained at a temperature not exceeding that of the steam. The temperature of the steam aroma exiting from the bed will be below 200° F. One yardstick will be that the aqueous steam aroma draw-off level recovered exceeds 0.1% of the whole coffee prior to its being wetted.

The blend of coffees can vary and it is an advantage of the present process that an excess of 50%, commonly in the order of 65% but as high as 100% of the grind employed, can be robusta coffee. The invention is not to be restricted to use of robusta particularly since a variety of coffees can be employed to suit taste. Indeed, the same may be said about caffeinated and decaffeinated coffees, since instants prepared from both types of coffee are benefited by following the invention. Thus, blends of 0 to 100 percent robusta have been employed to advantage together with 100 to 0 percent milds and 100 to 0 percent Santos. A typical and preferred blend comprises: 75 percent robusta, 25 percent milds.

The steam aroma per se that is recovered can be organoleptically categorized as providing a woody, green acid note. Measured in terms of the total volatile aromas which are collected the coffee aromas will be present in the aqueous steam aroma draw-off at levels of 0.1% to 1.5%, preferably 0.1% to 0.5% of the whole beans prior to wetting. The foregoing steam aromas collected are expressed as a weight percent of those condensed at 40° F.

The present vacuum steam aromas will usually have a relatively high percent of medium-boiling aromatics and an equal or lower percent of higher boiling aromatics. This aroma measure is to be contrasted with those recovered by atmospheric steaming wherein the higher boiling aromatics are usually present in the condensate at an amount greater by weight than the medium boiling aromatics. The steam aroma recovered by the vacuum means of this invention may be further characterized by a substantially lower titratable acidity in comparison with atmosphericly derived steam aroma.

BRIEF DESCRIPTION OF THE DRAWINGS

The invention will be better understood by reference to the accompanying drawings wherein FIG. 2 is a side elevation of a percolator in the series thereof showing the bayonet at the top section of each percolator column, FIG. 3 is an expanded section of the bayonet in FIG. 2 with parts in sectional elevation, FIG. 4 is a further expanded view of a portion of a wire assembly in the bayonet, and FIG. 5 is a further expanded cross-section of a portion of the wire assembly in the bayonet showing particles of ground roasted coffee in relation thereto.

EXAMPLE

Figure 1:
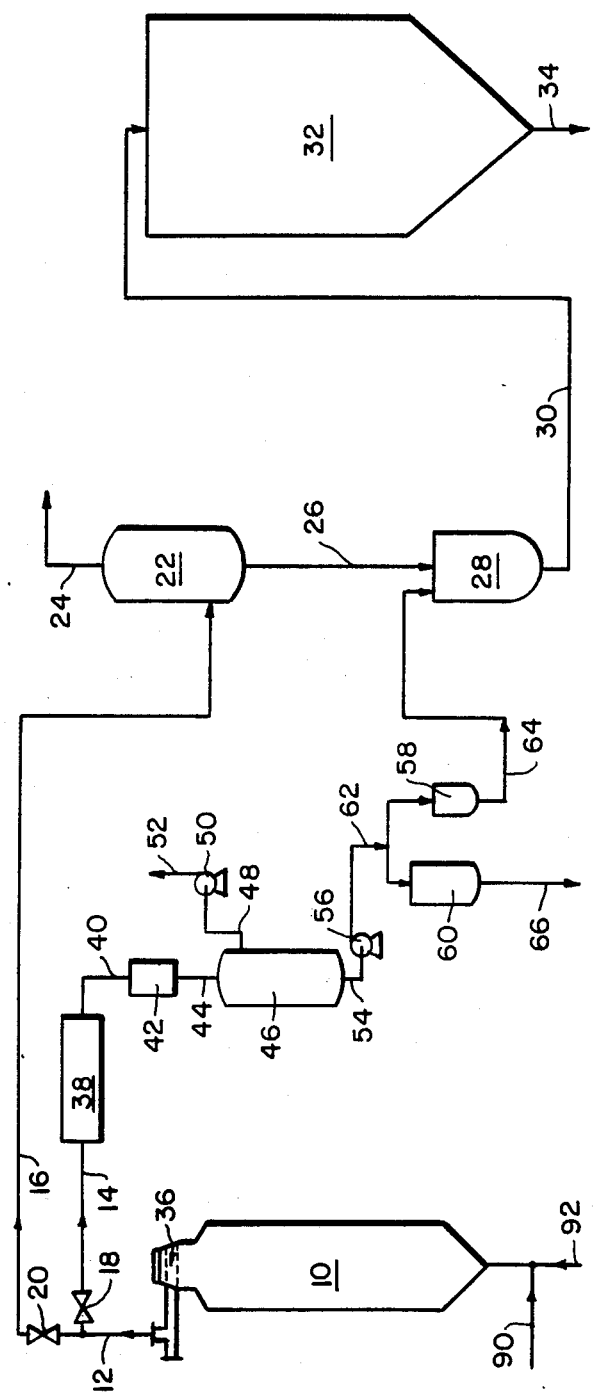
FIG. 1 is a schematic overview of a typical percolation zone in a series thereof.

The process will be described by reference to one percolator, it being understood that a preferred percolator train will consist of six operating in like manner. A typical apparatus for practicing the present process is set forth in the accompanying drawings and employs a percolator generally designated as 10 communicating through pipe 12 with either pipes of aroma collection system 14 or a dilute percolator extraction 16, through valves 18 and 20 respectively. The extract when passing line 16 enters evaporator 22 which in turn separates the flow as a water evaporate 24 and concentrated extract 26, the evaporated concentrate entering one of a pair of batching tanks 28. One of the tanks 28 serves to feed a batch to a spray dryer 32 through line 30, while another like tank is being prepared for blending with aromas. Eventually the dried product exits the spray tower 32 at 34 as a spray-dried powder.

Preparatory to actual percolation in 10, the aromatization aspects of the present invention are practiced. Steam and aromas are collected from the loaded column 10 through a draw-off bayonet 36. Steam aroma drawn off in pipe 12 is circulated under the influence of conditions to be hereinafter specified, valve 20 being rendered operative to disconnect line 16, and valve 18 communicating steam aroma vapors through line 14 to condenser 38. Steam aroma entering condenser 38 is preferably further chilled to 40° F. by passage through line 40 into chiller 42. Up to this point the entire system from each percolator 10 is maintained under a vacuum. Condensed steam aroma along with entrained air and carbon dioxide from the roasted and ground coffee enters a vapor/liquid separation zone shown as tank 46 through line 44. Vapor exiting from the tank 46 leaves the separation vessel through line 48 under the influence of vacuum pump 50, the vapor being either disposed of or otherwise used by means not forming part of the present system at line 52. Vacuum in chamber 46 is that of pump 50 and typically will be at 25 inches (Hg).

Steam aroma collection is effected by feeding the liquid separated through line 54 under the control of condensate pump 56 which feeds aroma collection tanks 58 and 60 through line 62. The primary or initial aroma fraction is recovered in aroma collection tank 58 which in turn communicates by line 64 with batching tank 28. Acids generated during later steaming of the roasted and ground coffee and removed with the steam aromas are usually discarded in collector 60 through pipe 66, it being understood that pipe 66 may be connected with line 64 to add a minor percent of steam aroma collected in tank 60 to the primary feed in line 64 if desired.

Each draw-off bayonet 36 as shown in FIG. 1 is located at the top of a respective percolator column and is otherwise described referring to FIGS. 2–5, as a draw-off bayonet assembly 67. Each assembly 67 comprises a cylindrical hollow portion mounted for rotation at one end in trunnion 70 and having a series of helically arranged wires 80 extending substantially horizontally across the upper neckeddown portion 68 of percolator 10, the wires terminating at the opposite end of assembly 67 as at 71 in a hollow cylindrical portion. Assembly 67 initially serves as the steam aroma draw-off for collecting the flow of aromas generated; later, extract flows upwardly through the bed and is directed to and through the spaces in the wire assembly 80. Assembly 67 also comprises a cylindrical wall portion 73 communicating with wall portion 71 within and spaced from a larger diameter cylindrical chamber wall 74 and maintained co-axial therewith under the control of positioning fins 95. Chamber wall 73 is fitted with a journal bearing 76 to maintain a co-axial relation with wall 74, a gasket 77 being stationed within a sealant holder 78 to assure co-axial seating and a steam-tight fit of the draw-off device.

To fill percolator 10, ground coffee passes through a filling port generally shown as 99 until it occupies the chamber area surrounding draw-off bayonet assembly 67, feed of roasted and ground coffee being thereafter terminated and the chamber being sealed. Steam is then admitted at the lower extremity of percolator column 10 through steam line 90 (FIG. 1) and percolates upwardly, wetting the ground coffee particles and generating steam aroma, the steam eventually carrying the aromas distilled from the roasted and ground coffee therewith. This vapor flow evenuates as a steam aroma surrounding the bayonet assembly 67. Steam aromas in the flow then enter assembly 67 between helically arranged wire 80, the wire being fixedly maintained by support bars 81 running lengthwise within the assembly.

Steam aroma passing the wire assembly 80 continues axially through the inside of the bayonet assembly 67 under the influence of the vacuum drawn by pump 50, and exits through a pair of slots 82 in cylindrical wall 73 (one shown) to a vertical draw-off port 83 having a ball valve 84 (shown in disengaged relation) and valve seats generally shown as 85, 86. A horizontal draw-off port 87, normally closed during aroma recovery, is located in chamber wall 74, port 87 being opened subsequently during extract recovery.

During the steam aroma collection phase of the operation, extract is not produced and extract draw-off port 87 is closed, effectively freeing the area intermediate cylindrical walls 73 and 74 for passage of steam aroma through slots 82 and outwardly and upwardly through draw-off port 83 and ball 84 to pipe 12. After steam aroma has been sufficiently collected and passed through valve 18 to condenser 38 et seq., the valve formed by ball 84 and valve seats 85-86 is closed, whereby additional steam aroma no longer enters draw-off line 14 through valve 18 which is also closed. Instead port 87 is opened to receive extract from percolator 10 for feeding pipe 12 through valve 20 and line 16. At this latter point coffee extraction commences, with steam line 90 closed and water entering the column at 92, extract exiting the elongated column 10 and entering the bayonet assembly 67 through the wires 80 thereof and eventually discharging intermediate cylindrical walls 73, 74 through port 87. In this latter position valve 20 is opened to feed extract though lines 16 to evaporator 22. Thus, the extract of roasted and ground coffee percolates upwardly and eventually is passed through the wires 80 of assembly 67 as before and thence through horizontal draw-off ports 87 to line 16. Hence, it will be noted that with the closure of ball valve 84-86 extracted coffee is recovered through port 87, whereas when ball assembly valve 84-86 is opened steam aroma exists therethrough.

It should be noted in passing that the left hand extremity of the aforesaid draw-off means comprises a cover 88 held in place by a collar means 89. The cylindrical walls 73 and 74 are maintained in fixed longitudinal relationship by disk-like cover 96 swingably mounted at 97. Through this means it is possible to remove and clean the operating portions of the device intermediate the cylindrical walls 73 and 74 as well as replace portions of the draw-off bayonet assembly 67 for servicing as required.

It should be noted that there is approximately 0.030" of open space intermediate the outer cylindrical faces formed by bases of adjoining wires 80 in the helix arrangement thereof (c.f. FIG. 5), so that it will pass a minimum of roasted and ground coffee therethrough. Whereas the amount of passage of roasted and ground coffee which may occur during the initial steaming operation is substantially nil, it will be understood that there will be some modicum of roasted and ground coffee which may pass initially during the percolation operation but this modicum will eventually be spent, such that the openings between adjoining cylindrical faces of the wire 80 serve to retain the body of the moistened roasted and ground coffee.

Of course, it will be noted that the range of openings between the wires 80 may vary depending upon size of the roasted and ground coffee, but, in general, wires 80 should be spaced sufficiently to pass both the steam aroma and the later extract without substantial migration of roasted and ground particles. The helical loops of wires 80 define an interrupted cylinder having the spaces between adjacent loops generally less axially than the size of the particles. The spaces between adjacent loops, as the respective loops' diameter decreases, will be larger than the size of the coffee particles allowing migration of coffee aromas and extract, depending upon the cycle portion in use. In this way the coffee particles during steaming, and later during extraction, form a permeable mat to permit steam aroma and later extract to be drawn away readily therefrom.

The particle size distribution in a given coffee grind of course will dictate the above spacing. Generally the particles will have a size distribution whereat prior to wetting, at least 45%, typically 45-55%, remains on a No. 8 U.S. Standard Sieve Mesh Screen. However, this is not a critical practice of the invention since practically all commercial grinds can be employed.

Figure 1A:
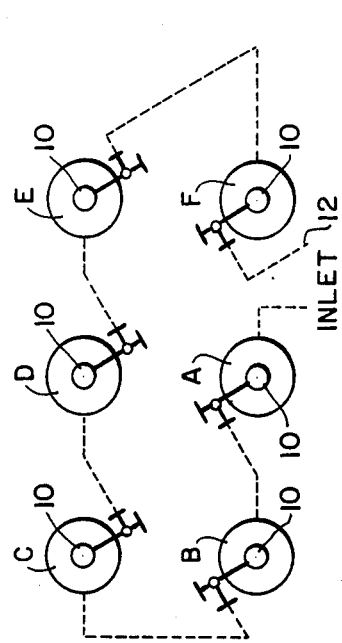
FIG. 1(a) is a schematic showing of a set of percolators operating in series.

It should be noted that the steaming operation will generally occupy a minority of the elapsed time in any total of steaming plus extraction. In a six column steaming operation such as is typically demonstrated in FIG. 1(a), the steam aroma will be recovered and thereafter the operation will involve intercommunication between two or more and typically six columns. During the steaming operation the quantity of steam aroma will be recovered say in a period of 20-30 minutes from fresh unextracted coffee. Thereafter, extract will be recovered in the column F, extract having already passed consecutively into the second, third, fourth, fifth, and sixth column as seen in FIG. 1a. Thus, column A will be the most spent or the lead column in the percolation train and will in turn feed columns B-E, whereafter it will feed column F in the cycle shown. During this latter percolation, i.e., of column F, a spent column will be emptied and a new set of comparable conditions created whereby the recovery of a steam aroma will again be practiced, all of which is well-known to those skilled in the art. Again, during this stage extract from percolator 10 is drawn off through a like bayonet 36 and line 12, and is caused to pass through line 16 to evaporator 22, steam aroma valve 18 being closed and valve 20 being opened to permit extract flow.

Typically for about 20 minutes, steaming of coffee occurs in a fresh percolator. During this period no percolation in the column is practiced and instead volatilization of the steam aromas exclusively is effected. During the entire steam aroma recovery process, vacuum will be maintained under the control of vacuum pump 50 at say 25" Hg, steam aroma issuing through the top of the vessel at 83 and at ball 84 throughout. After 20 minutes, steaming at the inlet to the percolator 10 is terminated, remaining steam being allowed to course upwardly and form steam aroma but to a lesser extent. Eventually, steam aroma collection is completed, whereupon the operator disconnects valve 18, ball valve 84 being adjusted to a closed position, which effectively disconnects the vacuum pump 50, whereupon the steamed coffee column is ready for extraction.

Each column is percolated for a typical period of say 4.5 hours to recover an extract having a solids content in the order of 10 to 15%, typically thirteen percent. This extract will then require concentration by evaporator 22 to a solids content of 40-55% leaving the concentrator and entering batching tank 28.

During the steam aroma collection phase of the operation, as indicated, vacuum pump 50 will maintain an essential vacuum typically as indicated of 25 inches(Hg), the vacuum broadly ranging from 10 inches to 27 inches. The nature of the steam aroma generated will vary somewhat with the vacuum employed, it being generally desired to maintain as high a degree of vacuum as practical to assure a maximum yield of aromas consistent with quality. It should be understood also that the steam aromas collected in tanks 58 and 60 will be those found at atmospheric conditions at 40° F., the desired aromas being collected as explained in tank 58 and those undesired for discard generally being in tank 60. It will be understood that concentrated extract and steam aroma entering batching tank 28 will be gently stirred by means not shown to assure a uniform condition of aromatized extract in line 30 entering spray dryer 32. Of course, in lieu of spray drying, freeze drying may be alternatively employed.

The means shown permit one to steam consistently under a vacuum and at a reasonable rate. Previously, in employing the steam aromas recovery means of the prior art, insufficient open area of the draw-off apparatus caused either blockage at the column top or sufficiently low flow rates to extend excessively the cycle time. By virtue of the present wedge wire bayonet principle, it is possible to vacuum steam consistently at reasonable flow rates producing a steam aroma of desired quality. By steaming under vacuum, it's possible to advantageously employ in the column the lower temperatures needed to provide a high quality steam aroma.

The following consitutes a typical and best mode of practicing the present invention. A blend of 75% robusta and 25% Santos is roasted and ground. The blend prior to loading the percolator is at ambient temperatures, say 68° F. The column is 30 inches in diameter and 15 feet-3 inches tall, the percolator being a carbon steel cylinder that has a stainless steel inner lining. The commercial grind is charged into the elongated chamber constituting the percolator column 10. As the coffee is being charged, the coffee is wetted by nozzle means suitably located and typically at point(s) beneath the filling port 99. The ground coffee is admixed with that amount of water sufficient to hydrate to a moisture content of 30%, the moistened coffee charged filling the percolator to a point generally above the level of the bayonet assembly 67. At this point the vacuum means 50 is disconnected and the charge is ready to be steamed.

Steam is supplied at 40 psig through steam line 90 and allowed to migrate upwardly passing through the bayonet 36 and entering line 12 through valve 18 into line 14, condensor 38, etc. Chiller 42 is an optional component, but, in general the steam volatilized liquid enters vapor separator tank 46. Liquid enters the suction side of pump 56 and is delivered through line 62 to either aroma collection tank 58 or 60. As indicated previously, tank 58 is employed to collect the more desirable, rich aromas, tank 60 being employed subsequently to collect the less fugacious aromas; approximately one part of the aroma collected in 58 to say three parts of the aroma collected in 60 is an appropriate balance, said latter aroma being either discharged or subsequently treated in a manner which is not part of the present invention.

Steam enters through line 90, the steam enters the column through a perforated pipe (not shown) and then migrates upwardly for a period of approximately 20 minutes, whereafter it is disconnected. Valve 28 is closed and valve 20 is open, thus terminating the steam aromatization and vaporization collection operation. Throughout this 20 minute interval pump 50 is operated and serves to provide 25 inches vacuum throughout the system. One hundred pounds of steam aroma water is collected by tank 58 and tank 60 collects another approximately 300 pounds of steam aroma water. As indicated it is possible to further process the steam aroma water at 60 but it is not presently practiced.

During the percolation operation which follows, nothing of consequence departing from that skill in the art is employed, it being understood that extract fed to evaporator 22 is approximately 13%, and the extract being concentrated to line 26 in the form of a thicker viscous material.

It will be seen from the above, that the designed draw-off apparatus coupled with the vacuum temperatures constitute the salient parts of the invention. A wedge wire bayonet of the type specified herein is the intended preferred device. Other devices allowing for ready passage of steam aroma and extract are contemplated. The wedge wire bayonet offers the distinct advantage of having in the order of 40% more open area than a perforated type. However, other designs in lieu of such a bayonet may be contemplated in accordance with this invention and it is not be restricted thereby. Also, while the invention has been described by reference to specific conditions peculiar to a batch system, the bayonet may be employed to like advantage in a continous system and accordingly the invention should be construed by reference to the accompanying set of claims.

We claim:
1. An improved process for steaming and thereafter extracting roasted and ground coffee in a percolator column wherein the improvement comprises:
   (a) vacuum steaming roasted and ground coffee for a period of at least 10 minutes at a temperature less than 200° F. in an elongated bed of the coffee maintained at a pressure from 10" to 27"(Hg) to produce a steam aroma, whereby the steam treatment of the coffee effects an internal refluxing and rectification of a codistilled mixture of steam, acids and volatile flavors with steam aroma;
   (b) recovering the steam aroma from step (a) by passage of same through a wedge-wire draw-off apparatus, the steam aroma being collected until at least 0.1% thereof by weight of the whole beans prior to wetting is recovered, said wedge-wire draw-off apparatus comprising a helically wound wire assemblage being internal to the percolator located at the upper extremity of the percolation zone operative to substantially pass steam aroma and thereafter coffee extract through the wire assemblage, the coffee being loaded in the column thereof to the point of coverage of the bayonnet;
   (c) thereafter percolating water through the coffee in the column to extract the solids therein for a period of at least one hour during which the extract is recovered from the percolator column by passage through the wedge-wire draw-off apparatus; and
   (d) eventually combining the extract and the aqueous steam aroma.

2. A process according to claim 1 wherein the steaming occurs at a temperature of less than 160° F.

3. A process according to claim 2 wherein the steaming occurs at 130° F. to 140° F.

4. A process according to claim 2 wherein the vacuum ranges to 23" to 26"(Hg.).

5. A process according to claim 1 wherein the coffee is moisturized to a level of 15-30% prior to steaming.

6. A process according to claim 4 wherein the extraction occurs over a period of three to six hours.

7. A process according to claim 1 wherein the longitudinal axis of the wedge-wire draw-off apparatus is located generally horizontally within the charge of roasted and ground coffee.

8. A process according to claim 7 wherein the wire convolutions are spaced one from the other a distance which does not allow substantial passage of roasted and ground coffee therethrough.

9. A process according to claim 8 wherein the outermost face of each of the helical loops defines an interrupted cylinder having the spaces between adjacent loops generally less than the size of the particles and, as points on corresponding respective loop diameters decrease, being generally larger than the size of the coffee particles, whereby the coffee particles during steaming and later during extraction form a permeable mat around spaces between adjacent helical loops to permit steam aroma and later extract to be drawn away readily therefrom.

10. A process according to claim 1 wherein the bed of roasted and ground coffee is at least 18" in diameter and the height thereof is at least 4 times the width.

11. A process according to claim 10 wherein the bed height is less than 7 times the width.

12. A process according to claim 1 wherein the roasted and ground coffee is wetted substantially as the coffee is loaded into the column thereof and whereafter the steam which is saturated is charged to the lower extremity of the coffee bed and progresses upwardly causing the coffee to undergo refluxing and rectification.

13. A process according to claim 12 wherein the steam volatilized aroma product is recovered after passage through the column over a period of less than ½ hour.

14. A process according to claim 1 wherein the steam aroma temperature leaving the bed is less than 200° F.

* * * * *